United States Patent [19]

Hanson et al.

[11] 4,423,479

[45] Dec. 27, 1983

[54] CACHE/DISK SUBSYSTEM WITH ACQUIRE WRITE COMMAND

[75] Inventors: Merlin L. Hanson, Arden Hills; Robert E. Swenson, Mendota Heights; Anthony R. Talarczyk, Montgomery, all of Minn.

[73] Assignee: Sperry Corporation, New York, N.Y.

[21] Appl. No.: 207,154

[22] Filed: Nov. 14, 1980

[51] Int. Cl.³ .............................................. G06F 13/02
[52] U.S. Cl. .................................................... 364/200
[58] Field of Search ............................... 364/200, 900

[56] References Cited

U.S. PATENT DOCUMENTS

| | | | |
|---|---|---|---|
| 3,422,401 | 1/1969 | Lucking | 364/200 |
| 3,737,881 | 6/1973 | Cordi et al. | 364/900 |
| 3,786,427 | 1/1974 | Schmidt | 364/200 |
| 4,078,254 | 3/1978 | Beausoleil et al. | 364/900 |

*Primary Examiner*—James D. Thomas
*Assistant Examiner*—David Y. Eng
*Attorney, Agent, or Firm*—Griffin, Branigan & Butler

[57] ABSTRACT

A cache/disk subsystem includes a host processor, a cache store, a disk drive device for driving a disk, and a storage control unit for controlling the transfer of data between the host, disk and cache store. The cache store holds segments of data which have been read from, or are to be written to, the disk. When the host issues a normal WRITE command to the storage control unit and none or a part only of the data from the disk space specified by the command is resident in the cache store, the segment or segments of data in the disk space are staged into the cache store and overlayed with data from the host. A directory in the host keeps track of the disk segments previously written to. When the host is ready to issue a WRITE command it checks the directory and, if the segment or segments to be written to have not previously been written to, then the host issues an ACQUIRE WRITE command. The storage control unit includes controls responsive to an ACQUIRE WRITE command for bypassing the staging operation. The storage control unit also includes circuits for converting a normal WRITE command to an ACQUIRE WRITE command when the beginning and ending addresses of a normal WRITE command fall on segment boundaries. The ACQUIRE WRITE command eliminates unnecessary staging from the disk to the cache store in situations where there is no data to be staged or all of the data which would be staged would be overwritten.

5 Claims, 1 Drawing Figure

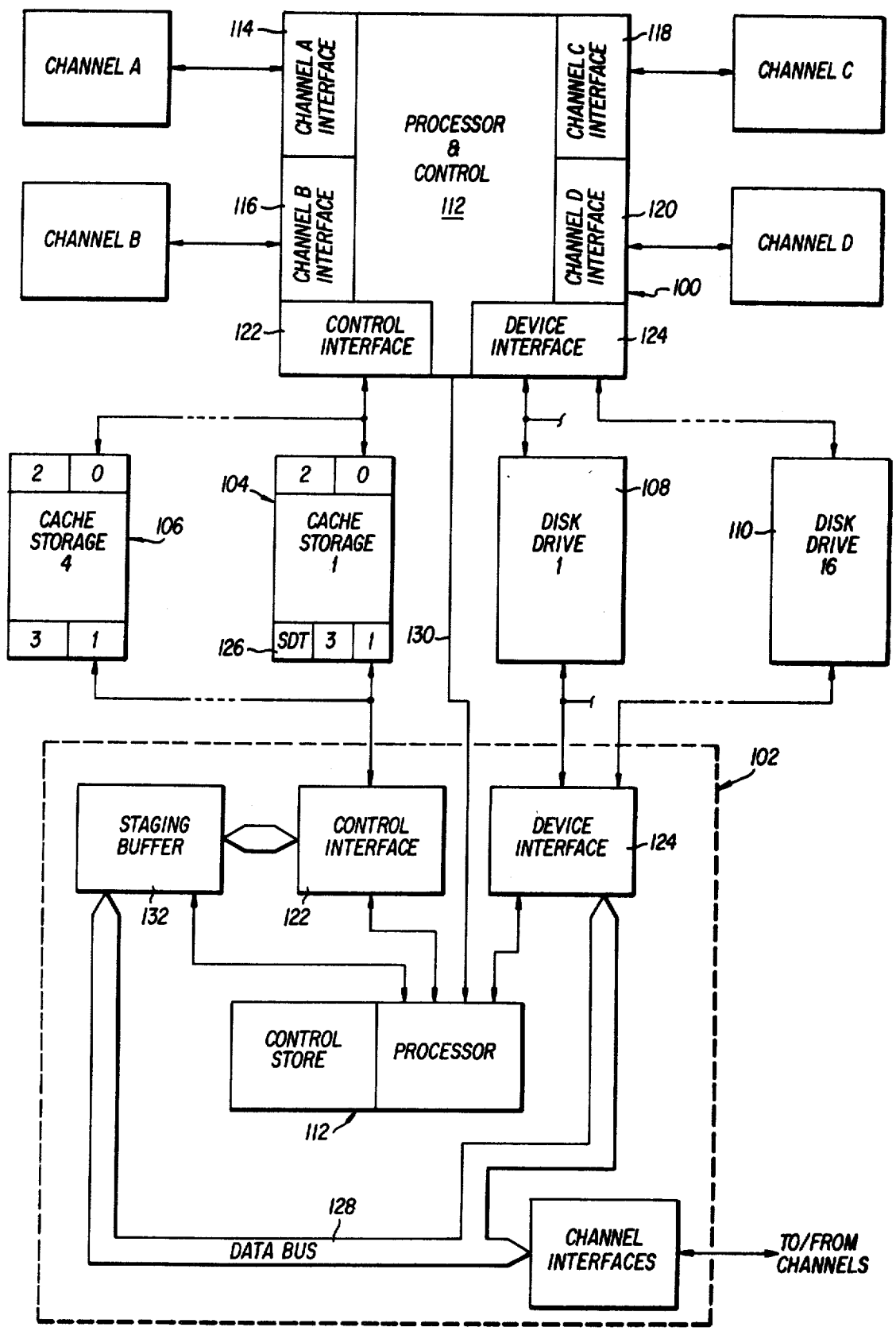

CACHE/DISK SUBSYSTEM WITH ACQUIRE WRITE COMMAND

RELATED APPLICATIONS

This application is related to the concurrently filed applications of Robert E. Swenson, Ser. No. 207,152, now U.S. Pat. No. 4,394,733 entitled Cache/Disk Subsystem and Ser. No. 207,097, now U.S. Pat. No. 4,394,732 entitled Cache Disk Subsystem Trickle, the disclosures of which are incorporated herein by reference.

BACKGROUND OF THE INVENTION

This application relates to a cache/disk subsystem for controlling the transfer of data between a host processor and a plurality of disk drive devices. As disclosed in the above-mentioned copending application Ser. No. 207,152, a basic cache/disk subsystem comprises a cache store, a disk drive device and a storage control unit for controlling the transfer of data between the cache store, the disk drive device and a host processor. The subsystem anticipates what disk addresses are the most likely to be accessed soon by the host and maintains the data from these disk addresses in the cache store. When a host wishes to access (read from or write to) a disk, it sends to the storage control unit a disk command including a disk space address which specifies the starting address and the number of words to be transferred. The storage control unit converts the disk space address to a cache store address and checks a segment descriptor table to see if the required disk data (i.e. the data from the disk space specified by the command address) is actually present in the cache store. If it is, the storage control unit causes the required disk data to be transferred between the host and the cache store and the disk is not accessed. Since the cache store can be accessed in a small fraction of the time it would take to position the head and read the required disk data from a disk, the provision of the cache store considerably reduces the average time required to access data on the disk.

If a host issues a READ or a WRITE command and the required disk data is not present in the cache store then it is obtained from the disk. In the case of a WRITE command, one or more segments of disk data are staged, i.e. transferred, from the disk to the cache store, after which this data is overlayed with the data from the host. The process of first staging the data from the disk to the cache store represents lost time if (1) the disk space being written to is being written to for the first time or (2) the disk space being written to comprises an integral number of data segments and begins and ends on a segment boundary. In the first case, there is no data to be overlayed after the staging operation and in the second case all of the data is written over after the staging operation. The present invention provides means for bypassing the staging operation for these two cases.

SUMMARY OF THE INVENTION

An object of the present invention is to provide a cache/disk subsystem having means for bypassing a cache store and writing data directly on a disk in response to an ACQUIRE WRITE command from a host indicating that this is the first time the disk space specified by the command has been written to.

An object of the present invention is to provide a cache/disk subsystem responsive to a normal WRITE command from a host for staging data from a disk to a cache store when the required disk data specified by the command is not present in the cache store, and means for bypassing the staging operation when the disk space specified by the command begins and ends on segment boundaries and comprises an integral number of segments.

An object of the present invention is to provide an improvement in a cache/disk subsystem of the type including a host processor, a disk drive device for driving a disk, a cache store for storing segments of data which are copies of segments of data which has been read from, or is to be written to disk space on the disk, a storage control unit for controlling the transfer of data between the host processor, the disk and the cache store in response to commands specifying a function and disk data addressing information specifying the disk space at which the function is to be performed, the storage control unit being responsive to a normal WRITE command from the host processor for staging data from the specified disk space to the cache store and overlaying it with data from the host processor if a part only of the data from the specified disk space is resident in the cache store, the improvement comprising means in the storage control unit, responsive to an ACQUIRE WRITE command from the host processor indicating that the addressing information of the ACQUIRE WRITE command specifies disk space not previously written to, for inhibiting the staging of data from the specified disk space to the cache store and, means responsive to the ACQUIRE WRITE command for transferring data from the host processor through the storage control unit to the cache store.

A further object of the invention is to provide a cache/disk subsystem as described above wherein the addressing information provided by the host processor specifies a starting address and the number of words to be written and the storage control unit includes means responsive to the addressing information for converting a normal WRITE command to an ACQUIRE WRITE command if the beginning and ending addresses of the normal WRITE command fall on segment boundaries.

A further object of the invention is to provide, in a cache/disk subsystem of the type including a host processor, a disk drive device for driving a disk, a cache store for storing segments of data which are copies of segments of data which has been read from or is to be written to disk space on the disk, and a storage control unit for controlling the transfer of data between the host processor, the disk and the cache store in response to commands specifying a function and disk data addressing information specifying the disk space at which the function is to be performed, the storage control unit being responsive to a normal WRITE command from the host processor for staging data from the specified disk space to the cache store and overlaying it with data from the host processor if a part only of the data specified by the disk addressing information is present in the cache store, the improvement wherein the addressing information provided by the host specifies a starting address and the number of words to be written, the storage control unit includes means responsive to the addressing information for generating a control signal if the beginning and ending addresses of a normal WRITE command fall on segment boundaries, means responsive to the control signal for converting a normal WRITE command to an ACQUIRE WRITE command, and means responsive to the ACQUIRE WRITE command for inhibiting the staging of a data segment from the disk to the cache store, and transferring data from the host processor through the storage control unit to the cache store.

A further object of the invention is to provide a cache/disk subsystem as described above wherein the addressing information defines addresses extending into at least two data segments.

Other objects of the invention and its mode of operation will become apparent upon consideration of the following description and the accompanying drawing.

BRIEF DESCRIPTION OF THE DRAWINGS

The single FIGURE comprises a system block diagram of a cache/disk system.

DETAILED DESCRIPTION OF THE INVENTION

Referring to the drawing, a cache/disk subsystem comprises two storage control units 100 and 102 for interfacing a plurality of channels (A-D), a plurality of cache storage units 104 and 106, and a plurality of disk drive devices 108 and 110. Host processors (not shown) supply commands and data to the subsystem through the channels and data and status information is returned to the host processors through the channels. The cache/disk subsystem shown in the drawing is described in detail in the application of Robert E. Swenson, Ser. No. 207,152, the disclosure of which is incorporated herein by reference. The present invention relates to the use of an ACQUIRE WRITE command as described in that application.

Normally, when a host processor wishes to write into disk space it issues a normal WRITE command which specifies the write function and further specifies the addressing information including the starting address and the number of words to be written into the disk space. The cache storage units, collectively referred to as the cache store, normally contain segments of data which are copies of data which have been read from, or are to be written to, disk space, these segments of data being the most likely to be used next. A normal WRITE command from a host processor is processed by a storage control unit which determines if a copy of the data from the disk space specified by the command is present in the cache store. If it is, the data is read from the cache store into a staging buffer 132 in the storage control unit, overlayed with the data from the host processor, and the resulting segment of data returned to the cache store.

If the data from the disk space specified by a normal WRITE command is not present in the cache store, it must be staged, i.e. transferred from the disk through the staging buffer 132 to the cache store. The data from the disk space is overwritten with the data from the host processor and the resulting segments of data stored in the cache store.

There are two situations where it is useless to first stage data from disk space before overlaying it with data from the host. The first situation is where the write operation is the first write to the specified disk space. In this case the disk space contains no data. Most large scale host processors, such as the Univac 1100 operating system, include a directory or other means for keeping track of disk file data such as highest address used, percentage of file space used, etc. When a host processor determines that the write operation it is about to command is the first write operation involving the disk space specified by the addressing information in the command, it issues an ACQUIRE WRITE command. The storage control unit decodes the ACQUIRE WRITE command, bypasses the step of staging of the data from the specified disk space to the cache store, and immediately writes the data into the cache store. The decoding of commands by the storage control unit is described at pages b 230-237 of application Ser. No. 207,152 and the ACQUIRE WRITE routine is described at pages 283-286.

The data written into the cache store by an ACQUIRE WRITE command is destaged to the specified disk space by either one of the storage control units when the storage control unit has no other more important work to do. This takes place under control of a Trickle routine as described in application Ser. No. 207,097.

The second situation where it is useless to first stage data from disk space to the cache store before overlaying it with data from the host occurs when a host processor issues a normal WRITE command and the addressing information in the command specifies disk space which begins and ends of segment boundaries. In this case the segment or segments of data which would be staged from disk space to the cache store would be completely overwritten with the data from the host processor so there is no need to stage the data from the disk space specified by the normal WRITE command. The storage control unit which receives the normal WRITE command decodes it and does calculations as explained at page 235 of application Ser. No. 207,152 to see if the disk space specified by the addressing information begins at a segment boundary and ends at a segment boundary. If it does, the storage control unit executes the normal WRITE command as if it is an ACQUIRE WRITE command.

The embodiments of the invention in which an exclusive property or privilege is claimed are defined as follows:

1. In a cache/disk subsystem including a host processor, a disk drive device for driving a disk, a cache store for storing segments of data which are copies of segments of data which have been read from, or are to be written to disk space on said disk, and a storage control unit for controlling the transfer of data between said host processor, said disk and said cache store in response to commands specifying a function and disk data addressing information specifying the disk space at which said function is to be performed, said storage control unit being responsive to a normal write command from said host processor for staging data from the specified disk space to said cache store and overlaying it with data from said host processor if less than all of the data from the specified disk space is resident in said cache store, the improvement comprising:

control means in said storage control unit, responsive to an acquire write command from said host processor indicating that the addressing information in the acquire write command specifies disk space not previously written to, for inhibiting the staging of data from said specified disk space to said cache store, and;

further means responsive to said acquire write command for transferring data from said host processor through said storage control unit to said cache store.

2. The improvement as claimed in claim 1 wherein said addressing information defines disk space extending into at least two data segments.

3. The improvement as claimed in claim 1 or claim 2 wherein the addressing information provided by said host processor specifies a starting address and the number of words to be written; and, said control means includes means responsive to said addressing information for executing a normal write command as if it were an acquire write command if the beginning and ending addresses of the normal write command fall on segment boundaries.

4. In a cache/disk subsystem including a host processor, a disk drive device for driving a disk, a cache store for storing segments of data which are copies of segments of data which have been read from or are to be written to disk space on said disk, and a storage control unit for controlling the transfer of data between said host processor, said disk and said cache store in response to commands specifying a function and disk data addressing information specifying the disk space at which said function is to be performed, said storage control unit being responsive to a normal write command from said host processor for staging data from the specified disk space to said cache store and overlaying it with data from said host processor if a part only of the data from the specified disk space is present in said cache store, the improvement wherein:

the addressing information provided by said host processor specifies a starting address and the number of words to be written;

said storage control unit including, means responsive to said addressing information for generating a control signal if the beginning and ending addresses of a normal write command fall on segment boundaries; and, means responsive to said control signal for inhibiting the staging of data from the specified disk space to the cache store, but transferring data from said host through said storage control unit to said cache store.

5. The improvement as claimed in claim 4 wherein said addressing information defines disk space extending into at least two data segments.

* * * * *